(12) United States Patent
Schuffenhauer

(10) Patent No.: US 11,529,687 B2
(45) Date of Patent: Dec. 20, 2022

(54) ROTARY CUTTING TOOL AND TOOL ASSEMBLY

(71) Applicant: Kennametal Inc., Latrobe, PA (US)

(72) Inventor: Michael Schuffenhauer, Fuerth (DE)

(73) Assignee: KENNAMETAL, INC., Latrobe, PA (US)

(*) Notice: Subject to any disclaimer, the term of this patent is extended or adjusted under 35 U.S.C. 154(b) by 48 days.

(21) Appl. No.: 17/122,244

(22) Filed: Dec. 15, 2020

(65) Prior Publication Data

US 2021/0178490 A1 Jun. 17, 2021

(30) Foreign Application Priority Data

Dec. 16, 2019 (DE) .................. 102019134596.0

(51) Int. Cl.
*B23B 31/00* (2006.01)
*B23B 31/113* (2006.01)

(52) U.S. Cl.
CPC .......... *B23B 31/005* (2013.01); *B23B 31/113* (2013.01); *B23B 2231/026* (2013.01); *B23B 2240/04* (2013.01)

(58) Field of Classification Search
CPC ............ B23B 2231/00; B23B 2231/02; B23B 2231/0244; B23B 2231/026; B23B 2231/0264; B23B 2231/0268; B23B 51/0473; B23B 2240/04; B23B 31/113; B23B 31/005; Y10T 279/17888
See application file for complete search history.

(56) References Cited

U.S. PATENT DOCUMENTS

| 2,039,855 | A | * | 5/1936 | Stone | ................... B23B 31/113 |
| | | | | | 279/83 |
| 3,262,474 | A | * | 7/1966 | Enders | ................ B23B 51/0473 |
| | | | | | 408/209 |
| 4,941,783 | A | * | 7/1990 | Maier | ..................... E21B 10/02 |
| | | | | | 279/93 |

(Continued)

FOREIGN PATENT DOCUMENTS

| DE | 10032966 | A1 | * | 1/2002 | ......... B23B 51/0473 |
| FR | 1272885 | A | * | 9/1961 | |
| JP | 59105311 | U | * | 7/1984 | |

OTHER PUBLICATIONS

Machine Translation, JP59-105311U. (Year: 1984).*

*Primary Examiner* — Chwen-Wei Su
(74) *Attorney, Agent, or Firm* — Christopher J. Owens

(57) ABSTRACT

A rotary cutting tool comprises a tool body having an axis of rotation (L) and a cylindrical shank, which comprises at least one locking groove via which the cutting tool can be axially locked in a tool holder. The locking groove has an axial groove, which extends from an axial end on the receiving side in axial direction (A) to an axial stop, and a circumferential groove, which is laterally adjacent to the axial groove and extends away from the axial stop and the axial groove in circumferential direction (U) toward a rotation stop. The circumferential groove comprises a first end face and a second end face opposite to said first end face, both of which extend in a plane that is perpendicular to the axis of rotation (L). A tool assembly having such a rotary cutting tool and a tool holder having a cylindrical tool receptacle for the cutting tool is provided as well.

11 Claims, 3 Drawing Sheets

(56) References Cited

U.S. PATENT DOCUMENTS

| | | | |
|---|---|---|---|
| 5,788,430 A * | 8/1998 | Meyen | B23B 51/0473 279/19.5 |
| 7,134,815 B2 * | 11/2006 | Steer | B23B 51/0473 408/239 R |
| D579,033 S * | 10/2008 | Miller | D15/139 |
| 7,469,909 B2 | 12/2008 | Strauch et al. | |
| 7,721,391 B2 | 5/2010 | Bukovitz et al. | |
| 7,896,590 B2 * | 3/2011 | Miller | B23B 51/0473 279/81 |
| 8,505,893 B2 | 8/2013 | Haimer | |
| 9,254,525 B2 | 2/2016 | Mizoguchi | |
| 9,415,449 B2 | 8/2016 | Herud | |
| 9,636,751 B2 | 5/2017 | Fahrion et al. | |
| 9,776,252 B2 | 10/2017 | MāTlik | |
| 10,201,860 B2 * | 2/2019 | Hoop | B23B 51/04 |
| 10,744,571 B2 * | 8/2020 | Fisher | B23B 31/113 |
| 2011/0318121 A1 * | 12/2011 | Eriksson | B23B 31/1076 407/120 |
| 2015/0360295 A1 | 12/2015 | Haimer | |
| 2017/0036275 A1 | 2/2017 | Haimer | |
| 2019/0151959 A1 * | 5/2019 | Ho | B23B 51/0473 |
| 2019/0168311 A1 | 6/2019 | Haimer | |

* cited by examiner

ROTARY CUTTING TOOL AND TOOL ASSEMBLY

RELATED APPLICATION DATA

The present application claims priority pursuant to 35 U.S.C. § 119(a) to German Patent Application Number 102019134596 filed Dec. 16, 2019, which is incorporated herein by reference in its entirety.

FIELD

The invention relates to a rotary cutting tool having a tool body, which at one axial end comprises a cylindrical shank having at least one locking groove, via which the cutting tool can be axially locked in a tool holder. The invention further relates to a tool assembly having such a rotary cutting tool and a tool holder.

BACKGROUND

Rotary cutting tools and tool holders for such rotary cutting tools are known, for example, as drills or milling cutters.

The rotary cutting tools (hereinafter referred to in short as cutting tools) are typically connected to the tool holder in a rotationally fixed manner by means of a chuck in order to transmit a torque to the cutting tool via the tool holder.

Vibrations that occur when machining a workpiece with the cutting tool can cause so-called axial migration during operation, in which the cutting tool moves out of the chuck along the axis of rotation. To prevent this axial migration, modern cutting tools are coupled to the tool holder via axial securing means, in which locking elements of the tool holder engage in locking grooves of the cutting tool and restrict an axial relative movement of the cutting tool with respect to the tool holder.

SUMMARY

The object of the invention is to provide a rotary cutting tool that can be coupled to a tool holder such that axial migration is reliably prevented.

To achieve said object, a rotary cutting tool is provided with a tool body which comprises a central longitudinal axis that forms an axis of rotation of the cutting tool. At one axial end, the tool body comprises a cylindrical shank having at least one locking groove, via which the cutting tool can be axially locked in a tool holder. The locking groove has an axial groove, which extends from an axial end on the receiving side in axial direction to an axial stop, and a circumferential groove, which is laterally adjacent to the axial groove and extends away from the axial stop and the axial groove in circumferential direction toward a rotation stop. The circumferential groove further comprises a first end face and a second end face opposite to said first end face, wherein both the first and the second end face extend in a plane that is perpendicular to the axis of rotation. The first and the second end face are therefore parallel.

In the context of the invention, a rotary cutting tool is a tool for machining workpieces, wherein the cutting tool rotates about an axis of rotation, i.e. for example a drill or a milling cutter.

It has been recognized that the end faces which extend perpendicular to the axis of rotation form stop surfaces that are particularly effective in preventing axial migration of the cutting tool, because, in contrast to curved stop surfaces or stop surfaces that are inclined to the axis of rotation, i.e. at an angle less than 90°, axial forces are introduced perpendicularly into the end faces.

The shank in particular has a basic shape that corresponds to a circular cylinder.

In one embodiment, in a sectional plane in which the axis of rotation is located, the circumferential groove has a rectangular cross-section. The radial inner side of the circumferential groove, which connects the two end faces and forms the base of the circumferential groove, consequently extends in axial direction. The radial inner side of the circumferential groove thus does not act as an axial stop surface, but only as a radial stop surface, whereby a force progression is established within the shank during operation, which particularly effectively suppresses axial migration.

It can be provided that, in a sectional plane that is perpendicular to the axis of rotation, the axial groove has a lenticular cross-section with a radially outer section which is formed by an envelope on the outer circumference of the shank and a radially inner section which is formed by a circular arc. This configuration of the axial groove has the advantage that the shank is structurally weakened by the axial groove only to a minor degree, as a result of which its durability and strength are high.

The maximum radial height of the lenticular cross-section can in particular be less than half of the radius of the circular arc of the radially inner section. The circumferential groove is thus deep enough in radial direction and the end faces are consequently wide enough in radial direction to form effective stop surfaces. At the same time, the axial groove is flat enough in radial direction that the shank is not significantly weakened.

In another embodiment, the rotation stop delimits a region of the circumferential groove which, in a sectional plane that is perpendicular to the axis of rotation, has a cross-section that corresponds to the cross-section of the axial groove in the half of said axial groove that is close to the circumferential groove. The circumferential groove is thus configured to ensure that a locking element having the cross-section of the axial groove abuts the rotation stop in a form-locking manner, as a result of which large forces can be reliably transmitted via the rotation stop.

The cutting tool can have a defined cutting direction that corresponds to a direction of rotation about the axis of rotation. The circumferential groove extends away from the axial groove in cutting direction so that, during operation, a locking element of the tool holder is pressed against the rotation stop or in direction thereof, as a result of which the cutting tool remains reliably axially secured.

According to one embodiment, the cutting tool comprises two to five corresponding locking grooves, in particular three to four corresponding locking grooves, which are spaced apart from one another in circumferential direction, in particular rotationally symmetrically. The cutting tool can consequently be axially secured via a plurality of locking grooves, so that the dimensions of the respective locking groove can be smaller without reducing the reliability with which axial migration is prevented by the locking grooves. The shank can be made to be particularly stable by using smaller locking grooves. A rotationally symmetrical arrangement also facilitates the insertion of the cutting tool and promotes an advantageous force progression under load in the shank.

According to the invention, a tool assembly having such a rotary cutting tool according to the invention and a tool holder having a cylindrical tool receptacle for the cutting tool is also provided to achieve the aforementioned object.

The tool holder has a common axis of rotation with the cutting tool. The tool receptacle comprises at least one locking element which is associated with the at least one locking groove. The tool assembly has a free position, in which the at least one locking element is disposed in the axial groove of one of the at least one locking grooves such that the cutting tool can be pulled out of the tool receptacle in axial direction, and a locked position, in which the corresponding locking element is disposed in the circumferential groove of the corresponding locking groove such that the cutting tool cannot be pulled out in axial direction. The cutting tool can thus be axially locked to the tool holder via the locking element and the locking groove when the cutting tool is inserted with the shank into the tool receptacle. In the locked position, the locking element and the locking groove form axial securing means which reliably prevent axial migration.

Due to the shape of the locking groove, the locking element and the locking groove form a type of bayonet closure, in which the cutting tool and the tool holder can be connected to one another and axially locked by inserting them axially into one another and rotating them in opposite directions. A part, which is attached to another part by means of a bayonet closure, has a longitudinal slot, at the end of which a lateral transverse slot begins. The other part, on the other hand, has a projection that is inserted into the transverse slot and then effects the fixed connection.

The tool receptacle in particular has a basic shape that corresponds to a circular cylinder.

In one embodiment, the at least one locking element comprises a first abutment surface and a second abutment surface disposed opposite to said first abutment surface, wherein both the first and the second abutment surface extend in a plane that is perpendicular to the axis of rotation. The abutment surfaces are therefore not only parallel to one another, but also extend parallel to the end faces of the circumferential groove. The tool assembly is thus designed such that, in the locked position, the abutment surfaces of the locking element can respectively abut the corresponding end face, which in this position is opposite, in a planar manner. As a result, the contact surface and the friction which occurs between the end faces and the corresponding abutment surfaces during operation are particularly large, so that a relative rotation of the cutting tool with respect to the tool holder is effectively suppressed and axial migration is thus reliably prevented.

According to a further embodiment, in a sectional plane that is perpendicular to the axis of rotation, the at least one locking element has a lenticular cross-section with a radially outer section which is formed by the inner circumference of the tool receptacle, and a radially inner section which is formed by a circular arc. This configuration has the advantage that the locking elements can be made to be particularly compact and durable.

It can in particular be provided that the radius of the circular arc of the radially inner section of the locking element corresponds to the radius of the circular arc of the radially inner section of the axial groove of the at least one locking groove. The locking elements are thus configured to be complementary to the axial groove, so that the contact surface between the end faces and the corresponding abutment surfaces is particularly large.

BRIEF DESCRIPTION OF THE DRAWINGS

Further advantages and features result from the following description and from the accompanying drawings. The figures show:

FIG. 1 shows a longitudinal section of a tool assembly 10 having a tool holder 12 and a rotary cutting tool 14, which is inserted in said tool holder 12.

The cutting tool 14 has a tool body 15, which extends along a longitudinal axis L.

An axial direction A, which corresponds to a direction parallel to the longitudinal axis L, is identified in FIGS. 1 to 5.

Figure 1:
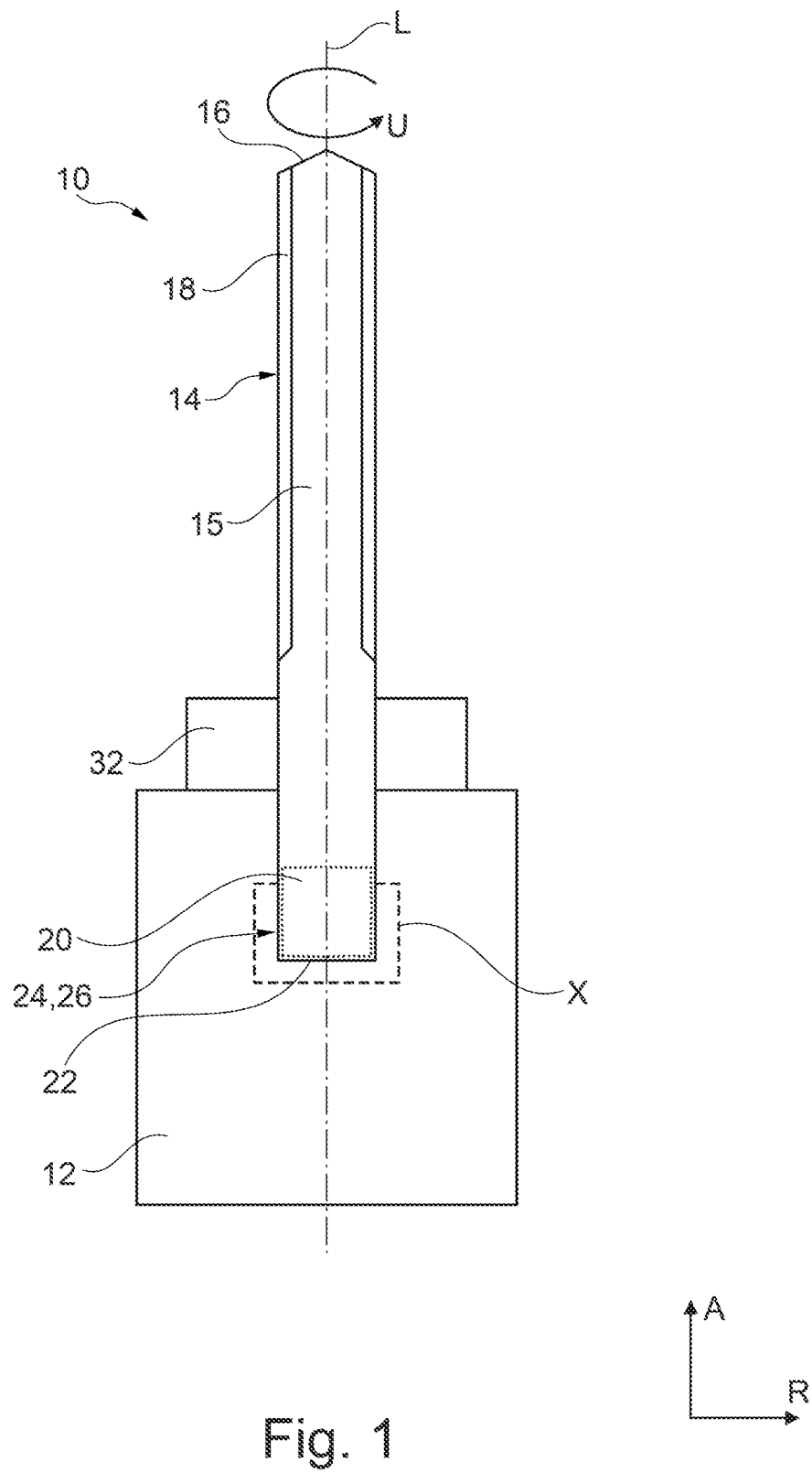
FIG. 1 in a schematic sectional view, a tool assembly according to the invention having a rotary cutting tool according to the invention and a tool holder, FIG. 2 in a bottom view looking in axial direction A, the rotary cutting tool of FIG. 1 showing an axial end on the receiving side of the rotary cutting tool, FIG. 3 in a lateral view, the axial end on the receiving side of the rotary cutting tool of FIG. 2, FIG. 4 in a plan view looking against the axial direction A, a section of the tool holder of FIG. 1 having a tool receptacle, and FIG. 5 in a lateral view, the section of the tool holder having the tool receptacle of FIG. 4, wherein hidden edges are indicated with dashed lines.
Figure 3:
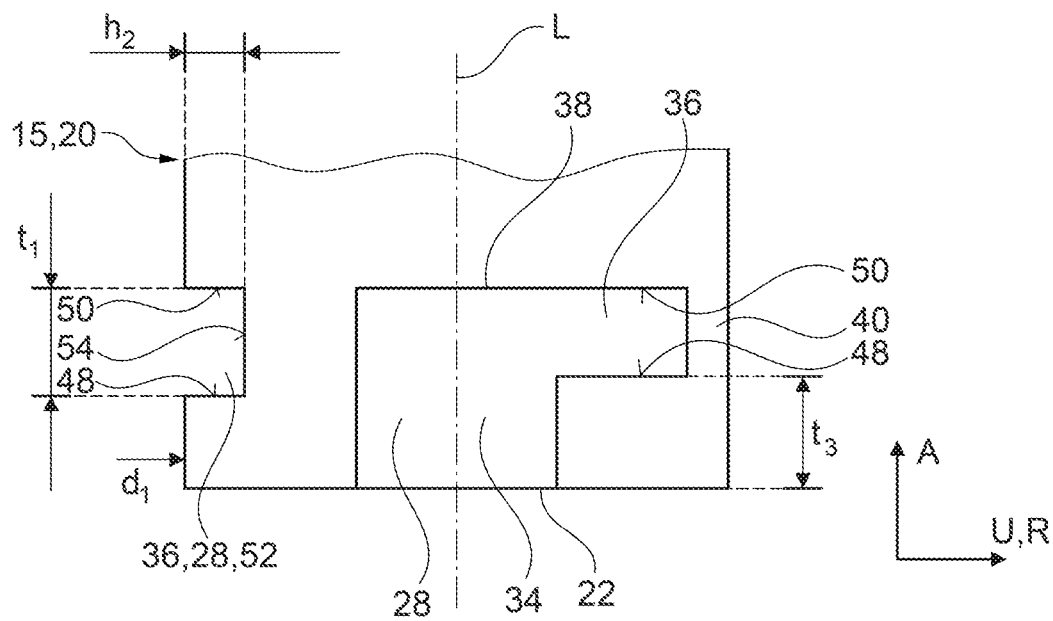
Figure 4:
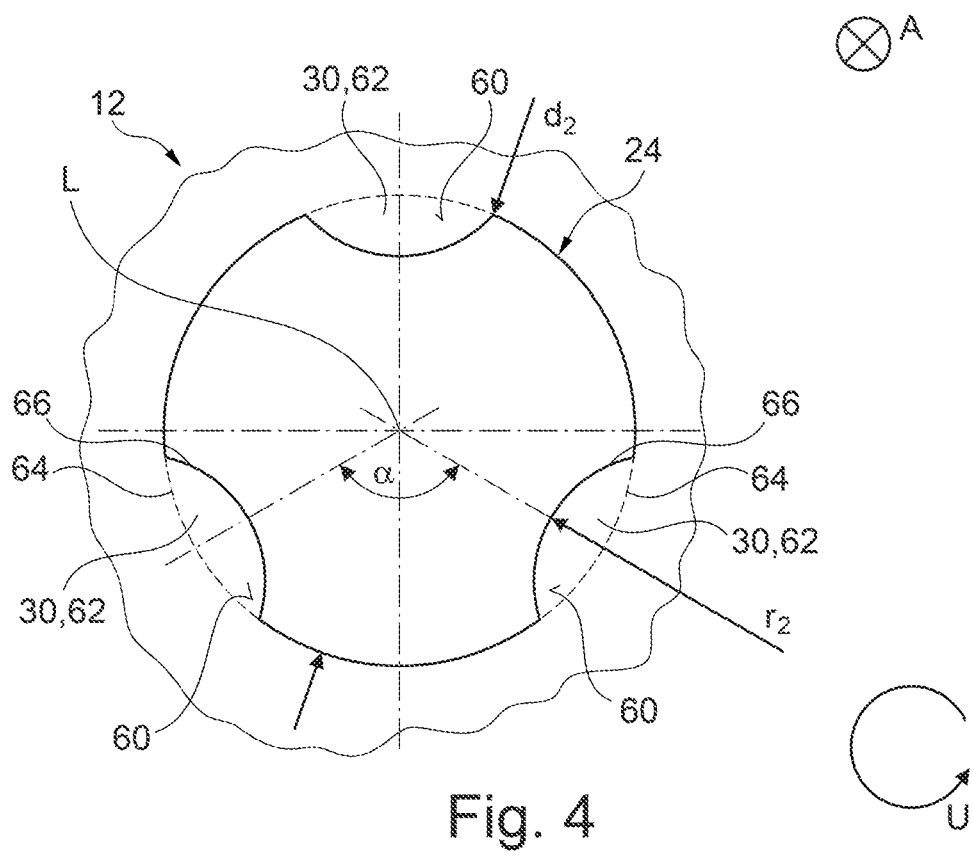
Figure 5:
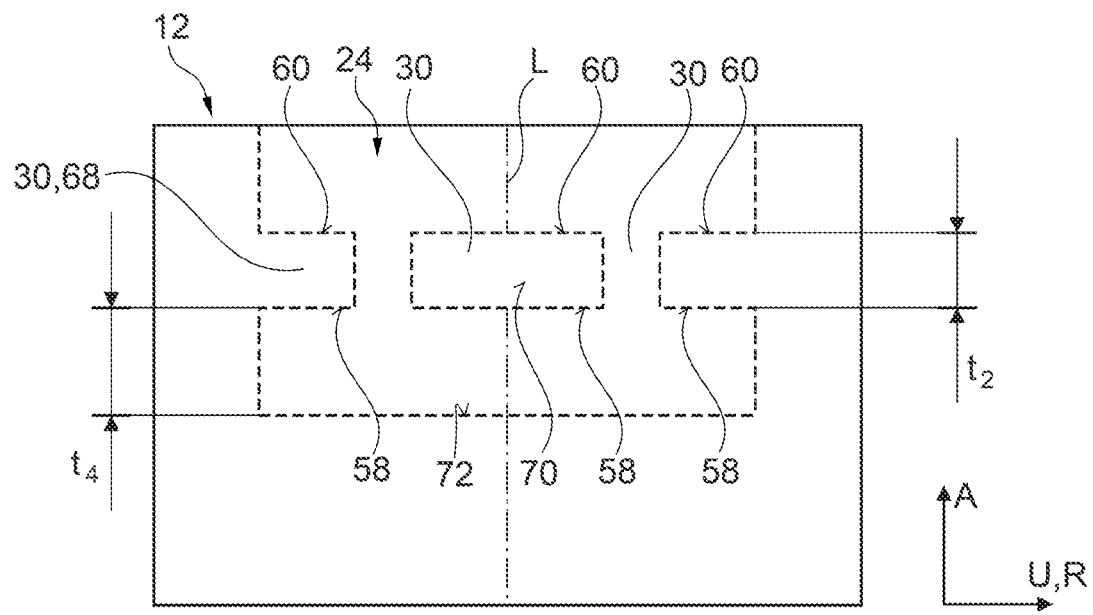

Furthermore, a radial direction R, which corresponds to a direction perpendicular to the longitudinal axis L, is identified in FIGS. 1, 3 and 5.

The longitudinal axis L also forms a common axis of rotation of the tool holder 12 and the cutting tool 14.

The cutting tool 14 is provided for machining in a defined direction of rotation, which in this case corresponds to the circumferential direction U in clockwise direction. This means that, during operation, the cutting tool 14 is driven in circumferential direction U so as to exert a cutting force on the workpiece.

In the present design example, the cutting tool 14 is a twist drill having a workpiece-side head 16 adjoined by helical flutes 18 and a shank 20 having an axial end 22 on the receiver side.

In principle, the cutting tool 14 can be any rotary cutting tool having a corresponding shank 20, for example a round drill, profile drill, tap drill, spot facer or milling cutter.

The tool holder 12 has a tool receptacle 24, which forms a chuck for the shank 20 of the cutting tool 14. The dashed region in FIG. 1 merely identifies the section X of the tool holder 12 shown in FIG. 5, in which the actual geometry of the tool receptacle 24 is shown.

The chuck is a shrink fit chuck or a hydraulic chuck, for example.

In order to prevent axial migration of the cutting tool 14 out of the tool holder 12 during operation, the tool assembly 10 comprises axial securing means 26, which are formed by a locking groove 28 (see FIGS. 2 and 3) in the shank 20 and corresponding locking elements 30 (see FIGS. 4 and 5) of the tool receptacle 24.

In the embodiment shown, the tool assembly 10 further comprises a securing element 32 in the form of a securing ring, which can be screwed to the tool holder 12 and additionally secures the cutting tool 14 in the tool holder 12.

However, such a securing element 32 is optional and can be omitted in an alternative embodiment.

Furthermore, the securing element 32 can in principle have any desired configuration and be coupled to the tool holder 12 in any way.

The structure and functioning of the axial securing means 26 are described in the following with the aid of FIGS. 2 to 5, in which hidden edges are indicated with dashed lines.

The shank 20 has the basic shape of a circular cylinder having a diameter d1 (see FIG. 2) and, in the present design example, has three locking grooves 28 which extend radially inward from the cylindrical outer casing.

The three locking grooves 28 are disposed rotationally symmetrically to one another at a respective angle α of 120°.

In principle, the shank 20 can comprise any number of locking grooves 28, in particular one to five locking grooves 28, wherein the number of locking grooves 28 substantially depends on the diameter d1 and thus on the available outer circumference of the shank 20.

Three or four locking grooves 28 are advantageous for a shank 20 having a diameter d1 of 20 mm to 40 mm.

The locking grooves 28 can furthermore be arranged as desired over the outer circumference of the shank 20; however, a rotationally symmetrical arrangement is preferred.

The locking grooves 28 are configured identically. The configuration of the locking grooves 28 is therefore explained in the following using a locking groove 28 as an example.

Of course, in an alternative embodiment, the locking grooves 28 can be configured differently from one another.

The locking groove 28 consists of an axial groove 34 (see FIG. 3) and a circumferential groove 36, which directly adjoins the axial groove 34 in circumferential direction U.

The axial groove 34 extends from the axial end 22 in axial direction A to an axial stop 38 (formed by a radial surface), whereas, adjoining the axial stop 38, the circumferential groove 36 extends in circumferential direction U away from the axial groove 34 to a rotation stop 40.

In a lateral view, the locking groove 28 thus has an "L" shape.

In the sectional plane perpendicular to the axis of rotation L (see FIG. 2), the axial groove 34 has a lenticular cross-section 42 with a radially outer section 44 and a radially inner section 46.

The radially outer section 44 is formed by a section of the envelope of the cylindrical shank 20 and is thus open.

The radially inner section 46 is a circular arc having a radius $r_1$.

The radius $r_1$ is preferably greater than the maximum radial height $h_1$ of the lenticular cross-section 42.

In an alternative embodiment, the axial groove 34 can in principle have any cross-section 42, as long as it does not prevent the insertion of a locking element 30 in axial direction A.

The circumferential groove 36 comprises a first end face 48 and a second end face 50, which are opposite to one another in axial direction A and both extend in a plane that is perpendicular to the axis of rotation L.

In a sectional plane in which the axis of rotation L is located, the circumferential groove 36 has a rectangular cross-section 52 (see FIG. 3), wherein the radial inner side 54 which forms the base of the circumferential groove 36 extends in axial direction A, whereas the opposite radial outer side is formed by a section of the envelope of the cylindrical shank 20 and is thus open.

In circumferential direction U from the axial groove 34 to the rotation stop 40, the circumferential groove 36 has a constant depth $h_2$ which corresponds to the maximum radial height $h_1$ of the lenticular cross-section 42.

Figure 2:
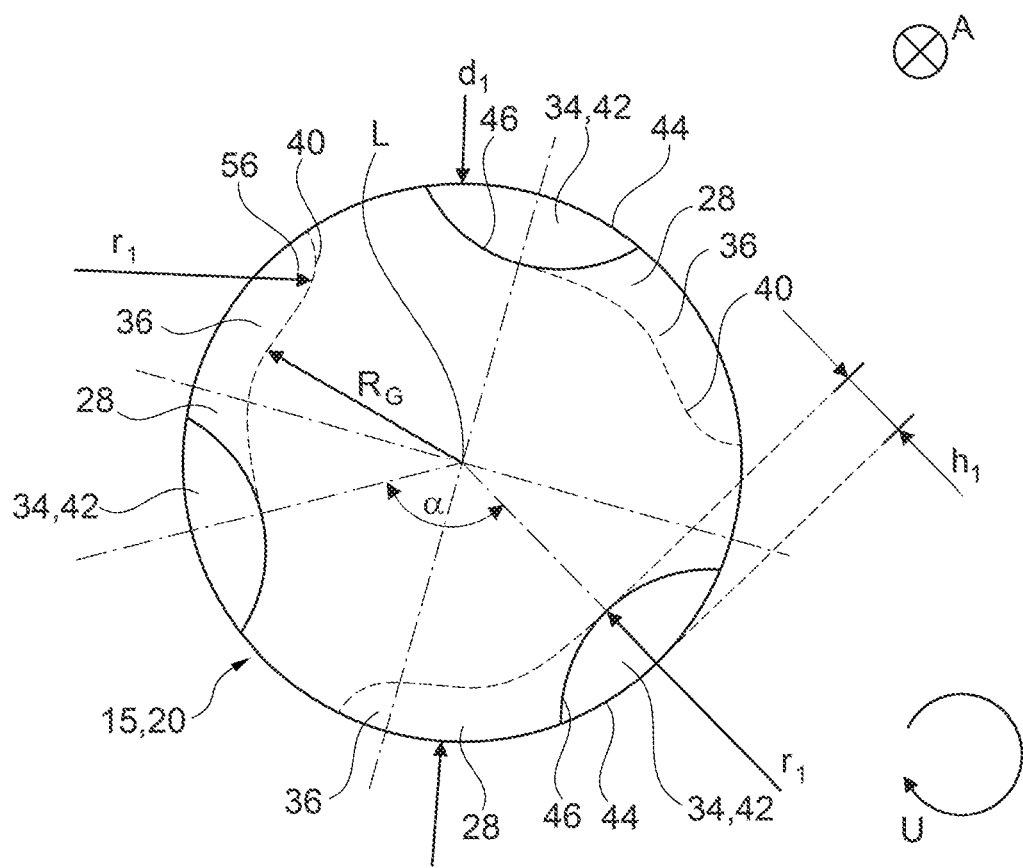

At the rotation stop 40, starting from the axial groove 34, the radial inner side 54 extends in a plane which is perpendicular to the axis of rotation L first along a cylinder having the radius $R_G$ from the longitudinal axis A and then in a curve having the radius $r_1$ radially outward to the envelope of the cylindrical shank 20, as a result of which, in a plane which is perpendicular to the axis of rotation L, the region 56 of the circumferential groove 36 adjacent to the rotation stop 40 has a cross-section which corresponds to half of the lenticular cross-section 42 that adjoins the circumferential groove 36 in circumferential direction U. In the view of FIG. 2, in simplified terms, it looks as if this half of the cross-section 42 has simply been pushed a little further clockwise to the end of the circumferential groove.

In an alternative embodiment, the circumferential groove 36 can in principle have any cross-section 52, as long as the first and the second end face 48, 50 extend parallel to one another and perpendicular to the axis of rotation L.

Like the shank 20, the tool receptacle 24 has the shape of a circular cylinder having a diameter d2 (see FIG. 4) and, in the present design example, has three locking elements 30 which extend radially inward from the cylindrical outer casing.

The diameter d2 of the tool receptacle 24 corresponds to the diameter d1 of the shank 20, so that the cutting tool 14 is reliably fixed in the tool holder 12.

In the case of a shrink fit chuck, for example, the components are designed such that there is play at the corresponding joining temperatures when joining and a press fit when the components are at the same temperature.

Of course, in an alternative embodiment, the diameter d2 of the tool receptacle 24 can be greater than the diameter d1 of the shank 20, so that the shank 20 can be inserted into the tool receptacle 24 by hand with minimal play, and thus without tools, even when the components have the same temperature.

Like the locking grooves 28, the three locking elements 30 are disposed rotationally symmetrically to one another at a respective angle α of 120°.

The tool receptacle 24 can in principle comprise any number of locking elements 30, however no more than the number of locking grooves 28 provided in the shank 20.

The tool receptacle 24 preferably comprises a number of locking elements 30 that corresponds to the number of locking grooves 28 in the shank 20.

In all embodiments the locking elements 30 are disposed complementarily to the locking grooves 28 so that, when the shank 20 is inserted into the tool receptacle 24 against the axial direction A, a respective locking element 30 can be pushed into a respective locking groove 28.

The locking elements 30 are configured identically. The configuration of the locking elements 30 is therefore explained in the following using a locking element 30 as an example.

Of course, in an alternative embodiment, the locking elements 30 can be configured differently from one another, in particular if the corresponding locking grooves 28 are configured differently too. This may be provided, for example, to align the cutting tool 14 in a specific position in the tool holder 12.

The locking element 30 comprises a first abutment surface 58 and a second abutment surface 60, which are disposed opposite to one another in axial direction A and both extend in a plane that is perpendicular to the axis of rotation L.

In the sectional plane perpendicular to the axis of rotation L, the locking element 30 has a lenticular cross-section 62 (see FIG. 4) with a radially outer section 64 and a radially inner section 66.

The radially outer section 64 of the locking element 30 is formed by a section of the envelope of the cylindrical tool receptacle 24.

The radially inner section 66 of the locking element 30 is a circular arc having a radius $r_2$.

The radius $r_2$ of the radially inner section 66 of the locking element 30 corresponds to the radius $r_1$ of the radially inner section 46 of the axial groove 34.

As a result, the locking element 30 is complementary to the axial groove 34; however, the locking element only has an axial height $t_2$ that corresponds to the axial height $t_1$ of the circumferential groove 36.

In an alternative embodiment, the locking element 30 can in principle have any cross-section 62, as long as it does not prevent the insertion of the locking element 30 into one of the axial grooves 34 in axial direction A.

In a sectional plane in which the axis of rotation L is located, the locking element 30 has a rectangular cross-section 68, which is only shown indirectly in the lateral view in FIG. 5 due to the perspective onto the locking elements 30. The radial inner side 70 of the locking element 30 extends in axial direction A between the first abutment surface 58 and the second abutment surface 60, whereas the opposite radial outer side is formed by a section of the envelope of the cylindrical tool receptacle 24.

In an alternative embodiment, the axial height $t_2$ can be smaller than the axial height $t_1$.

As a result, the locking element 30 is also complementary to the circumferential groove 36.

Furthermore, the axial distance $t_4$ between the first abutment surface 58 and an opposite bottom surface 72 of the tool receptacle 24 is at least as great as the axial distance $t_3$ between the first end face 48 and the axial end 22 of the shank 20.

All of the locking elements 30 are preferably integrally connected to one another, for example by means of a ring that is introduced into the base body of the tool holder 12 during the production of said tool holder 12.

To couple the cutting tool 14 to the tool holder 12, the shank 20 is inserted into the tool receptacle 24 in such a way that the locking elements 30 are aligned opposite to the axial grooves 34. The shank 20 is then pushed into the tool receptacle 24 against the axial direction until the locking elements 30 abut the axial stops 38 with the second abutment surfaces 60.

This position, in which the locking elements 30 are disposed in the axial grooves 34 and completely outside the circumferential grooves 36, describes a free position of the tool assembly 10. In the free position of the tool assembly 10, the axial securing means 26 are unlocked and the cutting tool 14 can be pulled out of the tool holder 12 in axial direction A.

To lock the axial securing means 26 so that the cutting tool 14 cannot be pulled out of the tool holder 12 in axial direction A, the cutting tool 14 is rotated against the circumferential direction U until the locking elements 30 abut the rotation stops 40. During this rotation, the locking element 30 moves along the stop 38, which continues laterally into the circumferential groove 36 and there forms the end face 50.

This position, in which the locking elements 30 are disposed at least in sections in the circumferential grooves 36, describes a locked position of the tool assembly 10.

The end faces 48, 50 of the circumferential groove 36 form parallel stop surfaces for the abutment surfaces 58, 60 of the locking elements 30.

Due to the complementary geometry of the locking elements 30 and the circumferential grooves 36, in particular in the regions 56 adjacent to the rotation stops 40, the locking elements 30 and the circumferential groove 36 are connected to one another in a form-locking manner in the locked position.

Any possible radial play is prevented in the locked state by the rotation stops 40 and locking elements 60 which taper in a wedge-like manner.

The shank 20 and the tool receptacle 24 are preferably dimensioned such that joining by hand is possible without tools, for example with a corresponding clearance fit. In the case of a shrink fit chuck, the components are designed such that there is play at the corresponding joining temperatures.

To facilitate shifting the tool assembly 10 into the locked position, opposing edges of the locking elements 30 and the circumferential grooves 36 can comprise an insertion geometry such as a chamfer or rounding.

Thus, a tool assembly 10 having a simply configured and at the same time effective axial securing means 26 is provided.

Furthermore, during operation, the locking elements 30 are pressed in circumferential direction U against the rotation stops 40, so that axial migration is reliably prevented.

In the embodiment shown, the axial end 22 of the shank 20 simultaneously forms an axial end of the cutting tool 14.

In an alternative embodiment, the cutting tool 14 can have an axial extension at the axial end 22, which extends away from the shank 20 against the axial direction A. However, the extension is configured such that it does not cover the axial groove 34 in axial direction A, so that the function of the axial securing means 26 is not impaired.

Such an extension can be configured for the torque-transmitting coupling of the cutting tool 14 to the tool holder 12 and, for this purpose, for example have a polygonal cross-section.

The invention is not limited to the shown embodiment. Individual features of one embodiment can in particular be combined as desired with features of other embodiments, in particular independently of the other features of the corresponding embodiments.

The invention claimed is:

1. A rotary cutting tool including a tool body comprising a central longitudinal axis (L) which forms an axis of rotation (L) of the cutting tool, wherein, at one axial end, the tool body comprises a cylindrical shank having at least one locking groove via which the cutting tool can be axially locked in a tool holder, wherein the locking groove has an axial groove, which extends from an axial end on a receiving side in axial direction (A) to an axial stop, and a circumferential groove, which is laterally adjacent to the axial groove and extends away from the axial stop and the axial groove in circumferential direction (U) toward a rotation stop, wherein the circumferential groove comprises a first end face and a second end face opposite to said first end face, wherein both the first and the second end face extend in a plane that is perpendicular to the axis of rotation (L), and wherein, in a sectional plane that is perpendicular to the axis of rotation (L), the axial groove has a lenticular cross-section with a radially outer section which is formed by an envelope on an outer circumference of the shank and a radially inner section which is formed by a circular arc.

2. The cutting tool according to claim 1, wherein, in a sectional plane in which the axis of rotation (L) is located, the circumferential groove has a rectangular cross-section.

3. The cutting tool according to claim 1, wherein a maximum radial height ($h_1$) of the lenticular cross-section is less than half of the radius ($r_1$) of the circular arc of the radially inner section.

4. The cutting tool according to claim 1, wherein the rotation stop delimits a region of the circumferential groove.

5. The cutting tool according to claim 1, wherein the cutting tool has a defined cutting direction (U) which corresponds to a direction of rotation (U) about the axis of rotation (L), wherein the circumferential groove extends away from the axial groove in the cutting direction (U).

6. The cutting tool according to claim 1, wherein the cutting tool comprises two to five corresponding locking grooves, which are spaced apart from one another in circumferential direction (U).

7. The cutting tool of claim 6, wherein the cutting tool comprises three to four locking groove.

8. The cutting tool of claim 6, wherein the locking grooves exhibit rotational symmetry.

9. A tool assembly comprising a rotary cutting tool according to claim 1, and a tool holder having a cylindrical tool receptacle for the cutting tool, wherein the tool holder has a common axis of rotation (L) with the cutting tool, wherein the tool receptacle comprises at least one locking element which is associated with the at least one locking groove, wherein the tool assembly has a free position, in which the at least one locking element is disposed in the axial groove of one of the at least one locking grooves such that the cutting tool can be pulled out of the tool receptacle in axial direction (A), and a locked position, in which the corresponding locking element is disposed in the circumferential groove of the corresponding locking groove such that the cutting tool cannot be pulled out in axial direction (A).

10. The tool assembly according to claim 9, wherein the at least one locking element comprises a first abutment surface and a second abutment surface disposed opposite to said first abutment surface, wherein both the first and the second abutment surface extend in a plane that is perpendicular to the axis of rotation (L).

11. The tool assembly according to claim 9, wherein, in a sectional plane that is perpendicular to the axis of rotation (L), the at least one locking element has a lenticular cross-section with a radially outer section which is formed by the inner circumference of the tool receptacle and a radially inner section which is formed by a circular arc.

* * * * *